(12) United States Patent
Hoover

(10) Patent No.: US 10,184,427 B2
(45) Date of Patent: Jan. 22, 2019

(54) VEHICLE COMPRISING A PRESSURIZED LIQUID FUEL SYSTEM AND METHOD FOR OPERATING A PRESSURIZED LIQUID FUEL SYSTEM

(71) Applicants: VOLVO TRUCK CORPORATION, Göteborg (SE); Dale Hoover, McConnellsburg, PA (US)

(72) Inventor: Dale Hoover, McConnellsburg, PA (US)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/746,414

(22) PCT Filed: Aug. 11, 2015

(86) PCT No.: PCT/US2015/044552
§ 371 (c)(1),
(2) Date: Jan. 21, 2018

(87) PCT Pub. No.: WO2017/027011
PCT Pub. Date: Feb. 16, 2017

(65) Prior Publication Data
US 2018/0202395 A1     Jul. 19, 2018

(51) Int. Cl.
*F02M 37/00*      (2006.01)
*F02M 21/02*      (2006.01)

(52) U.S. Cl.
CPC .... *F02M 21/0209* (2013.01); *F02M 21/0212* (2013.01); *F02M 21/0221* (2013.01);
(Continued)

(58) Field of Classification Search
CPC ........... F02M 21/0209; F02M 21/0275; F02M 21/0245; F02M 21/0239; F02M 21/0212;
(Continued)

(56) References Cited

U.S. PATENT DOCUMENTS 3,981,321 A     9/1976  Risse et al.
5,287,841 A *   2/1994  Forsythe ............ F02M 37/0023
                                                      123/510
(Continued)

FOREIGN PATENT DOCUMENTS

CN          101294523 A     10/2008

OTHER PUBLICATIONS

International Search Report (dated Oct. 28, 2015) for corresponding International App. PCT/US2015/044552.

*Primary Examiner* — Hai H Huynh
(74) *Attorney, Agent, or Firm* — WRB-IP LLP

(57) ABSTRACT

A vehicle including a pressurized liquid fuel system includes a first pressurized liquid fuel tank arrangement, a second pressurized liquid feel tank arrangement, and a balancing conduit open to a first fuel tank and to a second fuel tank at least one of above a maximum liquid level of the first fuel tank and a maximum liquid level of the second fuel tank and below a minimum liquid level of the first fuel tank and a minimum liquid level of the second fuel tank. A first return line and a second return Sine to the first and second fuel tanks are configured such that a pressure drop across the first, return line from a pressurized liquid fuel circulation system to the first fuel tank is adapted to be the same as a pressure drop across the second return line from the pressurized liquid fuel circulation system to the second fuel tank. Methods for operating a pressurized liquid fuel system are also disclosed.

21 Claims, 3 Drawing Sheets

(52) U.S. Cl.
CPC .... *F02M 21/0239* (2013.01); *F02M 21/0245* (2013.01); *F02M 21/0275* (2013.01); *F02M 37/00* (2013.01); *Y02T 10/32* (2013.01)

(58) Field of Classification Search
CPC .............. F02M 21/0221; F02M 37/00; F02M 37/0052; F02M 37/0088; F02M 37/0023; Y02T 10/32; B60K 15/03; B60K 2015/03144
USPC ........................................................ 123/514
See application file for complete search history.

(56) References Cited

U.S. PATENT DOCUMENTS

| | | | |
|---|---|---|---|
| 5,636,654 A | 6/1997 | Helm | |
| 5,960,809 A * | 10/1999 | Keller | F02M 37/0023 137/100 |
| 5,983,932 A | 11/1999 | Wagner et al. | |
| 6,799,562 B2 * | 10/2004 | Pratt | F02M 37/007 123/198 D |
| 6,845,782 B2 * | 1/2005 | Osterkil | B60K 15/077 137/1 |
| 7,028,671 B2 * | 4/2006 | McClure | F02M 33/08 123/514 |
| 7,168,415 B2 * | 1/2007 | Studebaker | F02D 33/003 123/509 |
| 7,246,606 B2 * | 7/2007 | Tokumaru | F02M 25/089 123/514 |
| 7,533,697 B2 * | 5/2009 | Zeiner | F02M 37/0023 137/266 |
| 7,757,662 B2 * | 7/2010 | Cooke | F02M 43/00 123/447 |
| 7,845,334 B2 * | 12/2010 | Lippa | F02D 19/0684 123/431 |
| 2005/0087246 A1 | 4/2005 | Zeiner et al. | |
| 2005/0224057 A1 | 10/2005 | Tokumaru et al. | |
| 2012/0180778 A1 | 7/2012 | Krause et al. | |
| 2012/0255621 A1 | 10/2012 | Meade | |

* cited by examiner

VEHICLE COMPRISING A PRESSURIZED LIQUID FUEL SYSTEM AND METHOD FOR OPERATING A PRESSURIZED LIQUID FUEL SYSTEM

BACKGROUND AND SUMMARY

The present invention relates generally to vehicles and methods involving pressurized liquid fuel systems and, more particularly, to such vehicles and methods involving plural fuel tanks.

It is known to provide pressurized liquid fuel systems for fuels such as propane and Dimethyl Ether (DME). The present invention relates generally to any such pressurized liquid fuel system, but will be described in connection with its application to a DME fuel system, except where otherwise indicated. DME shows substantial promise as a fuel for use in diesel and other engines. Its advantages include that it is sulfur-free and combusts with minimal particulate emissions, making it particularly attractive for meeting increasingly stringent emissions regulations.

DME has a low vapor pressure saturation curve. It will remain a liquid under moderately low pressure at ambient temperature conditions. For example, it would be a liquid at 20° C. and 5 bars. A DME fuel tank containing fuel at an elevated pressure would be considered a pressure vessel because the internal tank pressure will exceed ambient pressure. Pressure tanks or vessels designed today follow well established rules and guidelines to prevent bursting. The tank design involves selecting the proper material and thickness to meet the tensile strength required for the application, as well to provide necessary chemical resistance to the material being stored. In addition, pressure tanks incorporate a pressure relief valve that allows the excess pressure to be bled out of the container before the bursting pressure is reached, such as by dumping liquid on the ground or vapor into the atmosphere. The geometry of the tank design is also important, as curved surfaces are better than flat surfaces for evenly distributing stresses in the container. A vapor head space is normally used for storage of liquid in a pressure container. For liquid propane, 20% vapor head space is typically provided and, for liquid DME, 15% vapor head space is typically provided.

DME has an energy equivalent level of 1.88 gallons of DME to 1.0 gallon of diesel fuel. Larger tanks are therefore required to accommodate DME fuel than to accommodate diesel fuel containing the fuel providing equivalent energy. This is significant for fuel systems such as are used on vehicles such as trucks. For a truck that uses DME fuel, much larger tanks must be provided to go the same distance as a truck running on diesel fuel. Not only is it necessary to increase the volume of the equivalent diesel tank by a 1.88 multiplier, it is also necessary to allow for the expansion of the liquid fuel without exceeding the bursting pressure of the tank. Standard practice is to allow a 15% gas buffer zone above the liquid for expansion. For example, given a theoretical diesel fuel tank size of 100 gallons, for a tank containing an energy equivalent amount of DME, the volume is first multiplied by 1.88 so that at least a 188 gallon tank is required for the energy equivalent amount of DME. When a 15% expansion volume is added to this 188 gallons, a 216.2 gallon tank is required, i.e., $188+(0.15)*(188)=216.2$ gallon.

The large increase in volume necessary to provide DME fuel tanks that store an equivalent amount of energy presents problems in terms of packaging such tanks on a conventional diesel powered truck that would ordinarily be provided with, e.g., a 100 gallon tank. Consequently, the inventor proposes using multiple DME fuel tanks on vehicles, including on vehicles that have traditionally only used a single fuel tank.

The inventor has recognized that the use of multiple pressurized fuel tanks in a fuel system such as is used on a vehicle presents an array of problems. For example, it is not uncommon for a vehicle to be parked with one side exposed to the sun and the other side in the shade. If one fuel tank is in hot sunlight and the other remains cool, different pressures may develop in the tanks. If, for any reason, pressure is higher in one tank than the other, there will be a tendency for fuel in the higher pressure tank to be pumped into the fuel circulation system to the engine with a disproportionately higher flow rate than the fuel in the lower pressure tank (assuming each tank has an identical fuel pump). At the same time, there will be a tendency for fuel returning from the fuel circulation system to flow more into the lower pressure tank, rather than the higher pressure tank. Consequently, the risk exists that the fuel levels in the two tanks could become imbalanced with one being over-filled while one may be emptied. This can lead to a situation where fuel is pumped from only one tank at a time, and where excessive energy is expended by one pump ineffectively attempting to pump against another pump in a tank at a higher pressure.

The inventor has recognized that, for the multiple tank arrangements to be used effectively and so that the pumps in the tanks do not work against each other and the return flow is evenly divided between the tanks, the resistance to flow must be the same for each tank. It is, therefore, desirable to provide structures and techniques to equalize pressure in a fuel system including multiple fuel tanks.

In accordance with an aspect of the present invention, a vehicle comprising a pressurized liquid fuel system comprises fuel system components including a circulation system through which pressurized liquid fuel is adapted to be circulated, a first pressurized liquid fuel tank arrangement including a first fuel tank, a first fuel pump, a first feed line connected to the circulation system, and a first return line connected to the circulation system, a second pressurized liquid fuel tank arrangement including a second fuel tank, a second fuel pump, a second feed line connected to the circulation system, and a second return line connected to the circulation system, and a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank, wherein the first return line and the second return line are configured such that a pressure drop across the first return line from the circulation system to the first fuel tank is adapted to be the same as a pressure drop across the second return line from the circulation system to the second fuel tank.

In accordance with another aspect of the present invention, a method for operating a pressurized liquid fuel system is provided and comprises circulating pressurized liquid fuel through fuel system components including a circulation system, pumping pressurized liquid fuel from a first pressurized liquid fuel tank via a first fuel pump to the circulation system through a first feed line connected to the circulation system while also pumping pressurized liquid fuel from a second pressurized liquid fuel tank to the circulation system via a second fuel pump through a second feed line connected to the circulation system, returning pressurized liquid fuel to the first pressurized liquid fuel tank from the circulation system through a first return line connected to the circulation system while also returning pressurized liquid fuel to the second pressurized liquid fuel tank from the circulation system through a second return line connected to the circulation system so that a pressure drop across the first return line from the circulation system to the first fuel tank and across the second return line from the circulation system to the second fuel tank is the same, and balancing pressure in the first fuel tank and the second fuel tank by permitting flow between the first fuel tank and the second fuel tank through a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank.

In accordance with another aspect of the present invention, a method for operating a pressurized liquid fuel system is provided and comprises circulating pressurized liquid fuel through fuel system components including a circulation system, pumping pressurized liquid fuel from a first pressurized liquid fuel tank via first fuel pump to the circulation system through a first feed line connected to the circulation system while also pumping pressurized liquid fuel from a second pressurized liquid fuel tank to the circulation system via a second fuel pump through a second feed line connected to the circulation system, returning pressurized liquid fuel to the first pressurized liquid fuel tank from the circulation system through a first return line connected to the circulation system while also returning pressurized liquid fuel to the second pressurized liquid fuel tank from the circulation system through a second return line connected to the circulation system, and balancing pressure in the first fuel tank and the second fuel tank by permitting flow between the first fuel tank and the second fuel tank through a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank, and adjusting pressure drop across at least one of the first return line from the circulation system to the first fuel tank and the second return line from the circulation system to the second fuel tank so that pressure drop across the first return line from the circulation system to the fast fuel tank is different from pressure drop across the second return line from the circulation system to the second fuel tank such that pressure in the first fuel tank and the second fuel tank is balanced.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
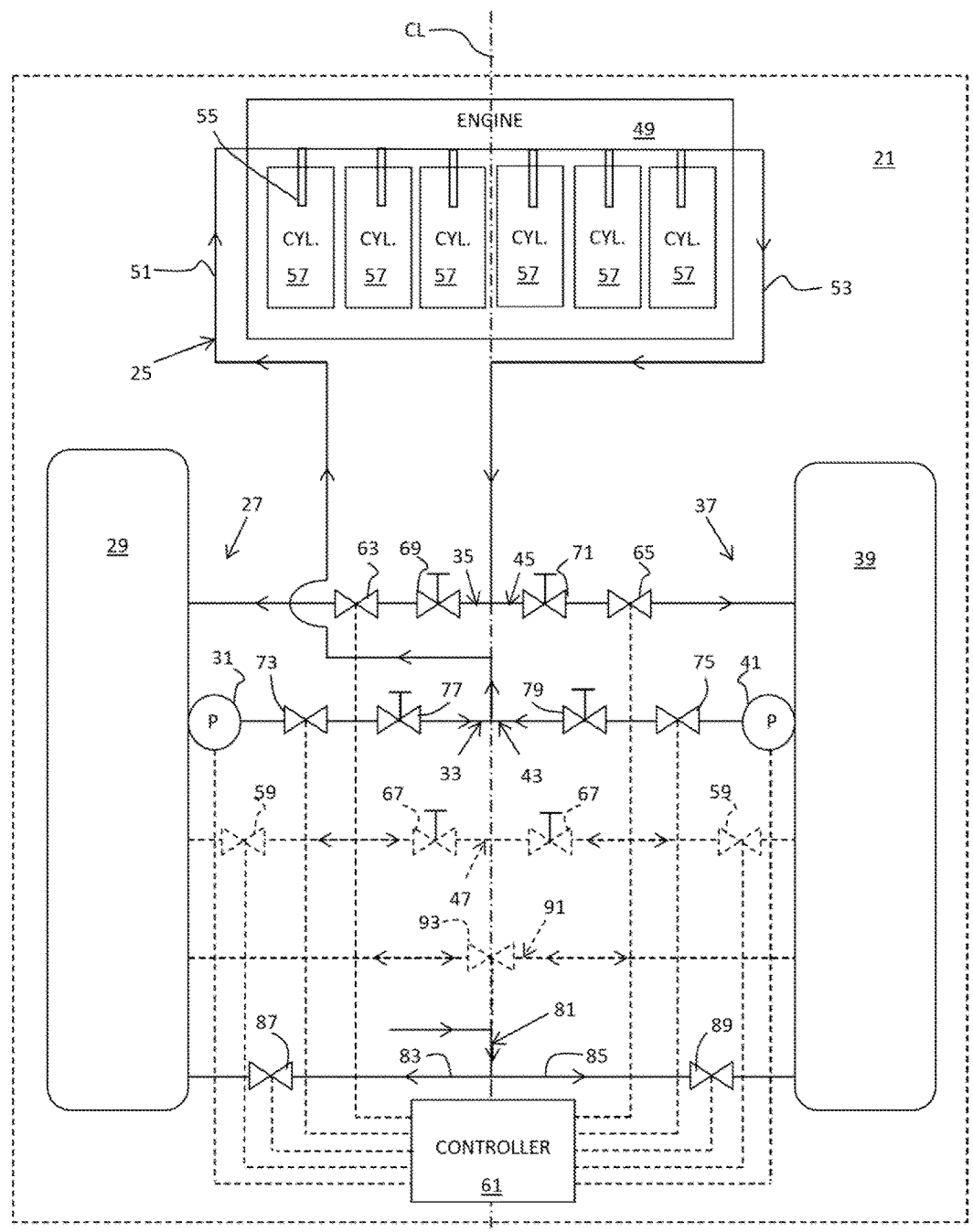
FIG. 1 is a schematic top view of vehicle including a pressurized liquid fuel system according to an aspect of the present invention.

A vehicle 21 comprising a pressurized liquid fuel system, such as a dimethyl ether (DME) fuel system, is shown in a schematic top view in FIG. 1. The present invention shall be described in connection with a DME fuel system, except where otherwise indicated, it being appreciated that the invention is applicable to other types of pressurized liquid fuel systems. Portions of the vehicle and fuel system are shown in a schematic side view in FIG. 2, as well. The vehicle 21 comprises fuel system components including a circulation system 25 through which DME is adapted to be circulated. The vehicle 21 comprises a first DME fuel tank arrangement 27 including a first fuel tank 29, a first fuel pump 31, a first feed line 33 connected to the circulation system 25, and a first return line 35 connected to the circulation system. The vehicle comprises a second DME fuel tank arrangement 37 including a second fuel tank 39, a second fuel pump 41, a second feed line 43 connected to the circulation system 25, and a second return line 45 connected to the circulation system.

The vehicle 21 can further comprise a liquid balancing conduit 47 (shown in phantom) open to the first fuel tank 29 and to the second fuel tank 39 below a minimum liquid level MINLL1 (FIG. 2) of the first fuel tank and a minimum liquid level MINLL2 (FIG. 2) of the second fuel tank. Alternatively to or in combination with the liquid balancing conduit 47, a vapor balancing conduit 91 (shown in phantom) can be open to the first fuel tank 29 and to the second fuel tank 39 above a maximum liquid level MAXLL1 (FIG. 2) of the first fuel tank and a maximum liquid level MAXLL2 (FIG. 2) of the second fuel tank. The liquid balancing conduit 47 may be open to the first and second fuel tanks 29 and 39 below the minimum liquid level MINLL1 and may be disposed entirely below the minimum liquid level as illustrated schematically in FIG. 2 so that liquid will be transferred through the conduit from one tank to the other as the result of gravity and differences in vapor pressure in the tanks. As seen in FIG. 3, however, the conduit 47' may, alternatively, extend so that ends 47e' of the conduit open to the first fuel tank 29 and to the second fuel tank 39 below the minimum liquid level MINLL1 of the first fuel tank and the minimum liquid level MINLL2 of the second fuel tank while at least a portion 47a' of the liquid balancing conduit is disposed above the minimum liquid level of the first fuel tank and the minimum liquid level of the second fuel tank. Portions of the conduit 47 or 47' may, for example, extend through the tanks 29 and 39. To the extent possible, it will often be desirable to run the conduits 47, 47', and 91 up above the tanks 29 and 39 and at least partially protect them with the frame F (shown in phantom in FIG. 3) of the vehicle to reduce the potential for damage to the conduits.

The fuel system components comprise an engine 49, the circulation system 25 comprises a feed portion 51 upstream of the engine and a return portion 53 downstream of the engine, and the fuel system components further comprise one or more fuel injectors 55 arranged to inject some DME in the feed portion into cylinders 57 of the engine.

The first return line 35 and the second return line 45 are configured such that a pressure drop across the first return line from the circulation system 25 to the first fuel tank 29 is adapted to be the same as a pressure drop across the second return line 45 from the circulation system 25 to the second fuel tank 39. By "the same", it will be appreciated that some minor difference may be present for a variety of reasons (e.g., temperature differences on different sides of the vehicle, obstructions in the lines, etc.), but the goal is to get equal pressure drops across both the first and second return lines 35 and 45. In this way, the pressure in the first and second fuel tanks 29 and 39 will tend to stay the same and fuel will not be preferentially pumped into one of the fuel tanks from the return portion 53 of the circulation system 25 thus tending to empty one of the tanks while possibly overfilling the other one of the tanks.

The first feed line 33 and the second feed line 43 can also be configured such that a pressure drop between the first fuel pump 31 and the circulation system 25 across the first feed line is adapted to be the same as a pressure drop between the second fuel pump 41 and the circulation system across the second feed line 43. This structure will further facilitate ensuring that fuel will not be preferentially pumped from one of the first and second fuel tanks 29 and 39 to the feed portion 51 of the circulation system 25 thus tending to empty one of the tanks while possibly overfilling the other one of the tanks.

In the embodiment shown in FIG. 1, the first return line 35 and the second return line 45 are symmetrical relative to the circulation system 25. More particularly, the first return line 35 and the second return line 45 have a same length, and a same diameter. While it is not necessary that the first return line 35 and the second return line 45 be symmetrical, or have the same length or diameter, this is a presently preferred technique for ensuring that the pressure drop across the first and second return lines is the same. Other components of the first and second DME fuel tank arrangements 27 and 37 can also be symmetrical, such as the first and second feed lines 33 and 43 being symmetrical relative to the circulation system 25. The first and second DME fuel tanks arrangements 27 and 37 can be symmetrical about a centerline CL of the vehicle 21.

Figure 2:
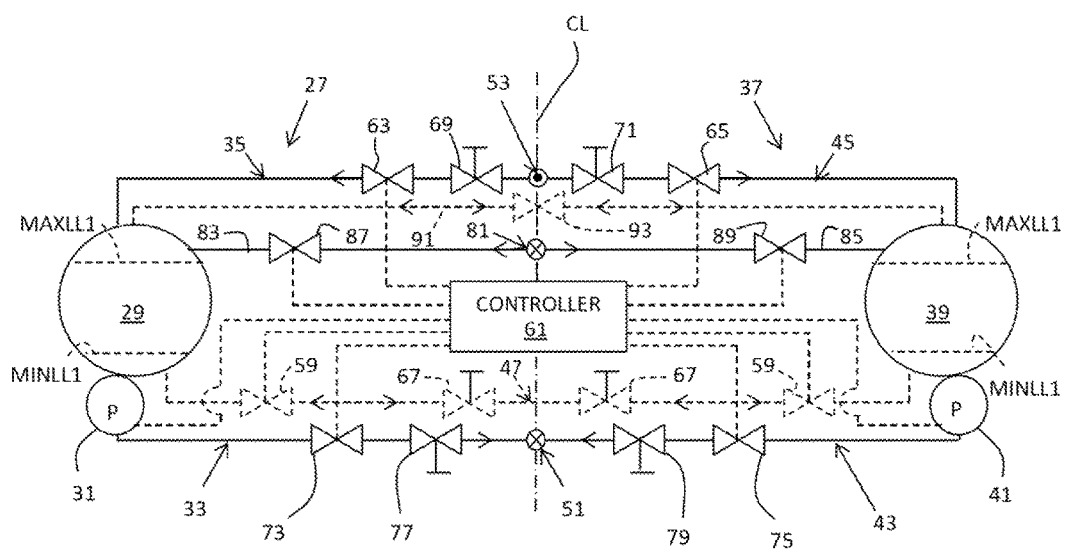
FIG. 2 is a schematic side view of a portion of a vehicle and a pressurized liquid fuel system according to an aspect of the present invention.
Figure 3:
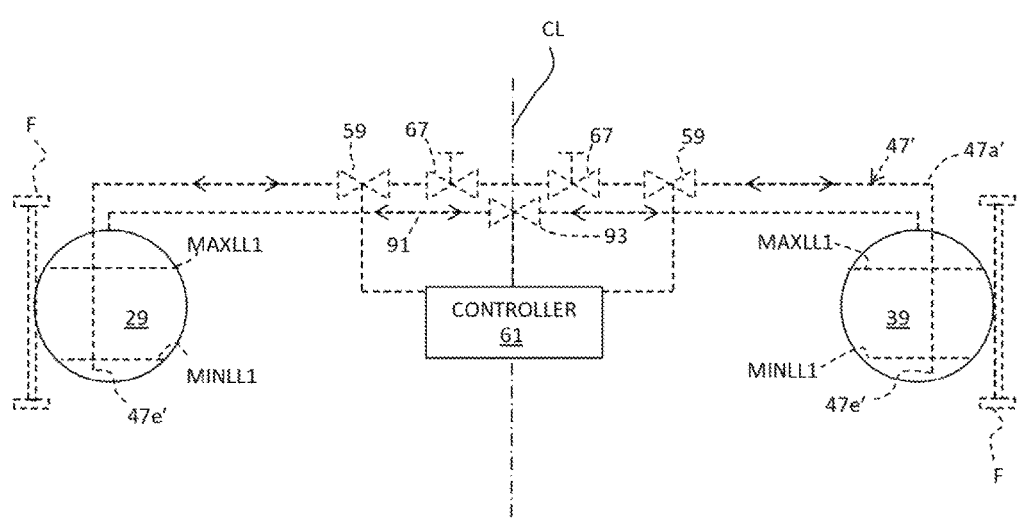
FIG. 3 is a schematic side view of a portion of a vehicle and a portion of a pressurized liquid fuel system according to an aspect of the present invention.

The liquid balancing conduit 47 ordinarily comprises a liquid balancing valve 59 (or, as shown in FIGS. 1 and 2, valves). The vehicle 21 ordinarily comprises a controller 61 arranged to close the liquid balancing valve 59 when the engine 49 is off and to open the liquid balancing valve when the engine is on. One or more vapor balancing valves 93 can be provided in the vapor balancing conduit 91 to close off the vapor balancing conduit in the manner that the valves 59 can close off the liquid balancing conduit 47 and can be controlled by the controller 61.

A first return valve 63 can be provided in the first return line 35 and a second return valve 65 can be provided in the second return line 45. The controller 61 can be arranged to control opening and closing (or degree of opening and closing) of the first return valve 63 and the second return valve 65 upon start-up of the engine 49 to alter the pressure drop across the first return line 35 from the return portion 53 of the circulation system 25 to the first fuel tank 29 and across the second return line 45 from the return portion of the circulation system to the second fuel tank 39 to equalize pressure in the first and second fuel tanks. The liquid balancing valve 59 and/or the vapor balancing valve 93 and the first and second return valves 63 and 65 can be electronically controlled valves that are controlled to open and close (fully or partially, as desired) by a signal from the controller 61.

A liquid balancing conduit manual valve 67 (or, as shown in FIGS. 1 and 2, valves) can be provided in the liquid balancing conduit 47, a first return line manual valve 69 can be provided in the first return line, and a second return line manual valve 71 can be provided in the second return valve. These manual Valves 67, 69, 71 can be closed to, e.g., facilitate work on the fuel tank arrangements 27 and 37, or the fuel system such as the circulation system 25 and its components.

A first feed valve 73 can be provided in the first feed line 33 and a second feed valve 75 can be provided in the second feed line 33. The controller 61 can be arranged to control opening and closing (or degree of opening and closing) of the first feed valve 73 and the second feed valve 75 upon start-up of the engine 49 to alter the pressure drop across the first feed line 33 to the feed portion 51 of the circulation system 25 from the first fuel tank 29 and across the second feed line 33 to the feed portion of the circulation system from the second fuel tank 39 to equalize pressure in the first and second fuel tanks. The first and second fuel pumps 31 and 41 can also be controlled by the controller 61 to equalize pressure and fluid contents in the first and second feed lines 33 and 43 and to ensure that equal amounts of fuel at equal pressures are in each feed line.

A first feed line manual valve 77 can be provided in the first feed line 33, and a second feed line manual valve 79 can be provided in the second feed line 41. These manual valves 77 and 79 can be closed to, e.g., facilitate work on the fuel tank arrangements 27 and 37, or the fuel system such as the circulation system 25 and its components.

A fill line 81 for filling the first and second fuel tanks 29 and 39 with DME is typically provided. The fill line 81 can include a first branch 83 leading to the first fuel tank 29 and a second branch 85 leading to the second fuel tank 39, a first fill line valve 87 in the first branch, and a second fill line valve 89 in the second branch. The opening and closing and degree of opening and closing of the first and second fill line valves 87 and 89 can be controlled by the controller 61 to adjust a pressure drop across the first and second branches 83 and 85 to fill the first and second fuel tanks 29 and 39 at different rates to facilitate equalizing fluid contents and pressure in the tanks.

The vapor balancing conduit 91 can be open to the fast fuel tank 29 and to the second fuel tank 39 above a maximum liquid level MAXLL1 (FIG. 2) of the first fuel tank and a maximum liquid level MAXLL2 (FIG. 2) of the second fuel tank. When filling the tanks 29 and 39, the vapor balancing conduit 91 can assist in ensuring that the tanks are filled equally by equalizing gas pressure in the tanks. One or more vapor balancing valves 93 can be provided in the vapor balancing conduit 91 to close off the vapor balancing conduit in the manner that the valves 59 can close off the liquid balancing conduit 47 and can also be controlled by the controller 61. If both a liquid balancing conduit 47 and a vapor balancing conduit 91 are provided, one may choose to close the vapor balancing valve 93 during operation of the engine 49 so that balancing of pressure in the first and second fuel tanks 29 and 39 will be accomplished primarily by fluid in the tanks being forced to the lower pressure tank through the liquid balancing conduit 47. Of course, in some circumstances, it may be preferred to close the liquid balancing conduit 47 and balance pressure via the vapor balancing conduit 91. As in the liquid balancing conduit, manual valves (not shown) can be provided in the vapor balancing conduit 91 to facilitate isolating the fuel tank arrangements 27 and 37 or components of the fuel system such as the circulation system 25 and its components.

If only a liquid balancing conduit 47 is employed, then any pressure imbalance between the two tanks 29 and 39 will result in fuel in the higher pressure tank being pushed into the lower pressure tank until the tanks are at equal pressure. If only the vapor balancing conduit 91 is employed, then, if any pressure imbalance exists between the two tanks 29 and 39, the vapor pressure from the higher pressure tank will flow to the lower pressure tank until the pressure between the two tanks is equal. The use of only the liquid balancing conduit 47 may rapidly overfill a lower pressure fuel tank if a tank component failure was directing more of the heated return fuel back to one tank versus the other tank. The tank with the higher fuel return would develop a higher internal tank pressure and force the fuel in that tank to the lower pressure tank, depleting the fuel in the higher pressure tank while over filling the lower pressure tank. The use of only the vapor balancing conduit 91 permits passage of fuel vapor and maintains generally equal pressures in the tanks. The vapor leaving the (often hotter) higher pressure tank flows through the vapor balancing conduit into the lower pressure (often cooler) tank in which the fuel vapor can tend to condense back to the liquid form. Equilibrium between the two tanks occurs when the vapor pressures in both tanks are equal. When using only the vapor balancing conduit 91 and having a component failure as noted above, the tanks liquid levels would be affected at a slower rate. In case of one tank becoming over full (above the maximum fill level), a vapor space above the balance line entry level will ordinarily still exist and excess fuel will flow through the balance line into the other tank maintaining a safe condition.

A method for operating a dimethyl ether (DME) fuel system according to an aspect of the present invention is described in connection with the DME fuel system illustrated in FIGS. 1 and 2. The method includes circulating DME through fuel system components including a circulation system 25, pumping DME from a first DME fuel tank 29 via a first fuel pump 31 to the circulation system through a first feed line 33 connected to the circulation system while also pumping DME from a second DME fuel tank 39 to the circulation system via a second fuel pump 41 through a second feed line 43 connected to the circulation system. DME is returned to the first DME fuel tank 29 from the circulation system 25 through a first return line 35 open to the circulation system while also returning DME to the second DME fuel tank 39 from the circulation system through a second return line 45 open to the circulation system so that a pressure drop across the first return line from the circulation system to the first fuel tank and across the second return line from the circulation system to the second fuel tank is the same. Pressure in the first fuel tank 29 and the second fuel tank 39 can be balanced by permitting liquid flow between the first fuel tank and the second fuel tank through the liquid balancing conduit 47 open to the first fuel tank and to the second fuel tank below a minimum liquid level MINLL1 (FIG. 2) of the first fuel tank and a minimum liquid level MINLL2 (FIG. 2) of the second fuel tank. Alternatively, or at the same time, pressure in the first fuel tank 29 and the second fuel tank 39 can be balanced by permitting vapor flow between the first fuel tank and the second fuel tank through the vapor balancing conduit 91 open to the first fuel tank 29 and to the second fuel tank 39 above a maximum liquid level MAXLL1 (FIG. 2) of the first fuel tank and a maximum liquid level MAXLL2 (FIG. 2) of the second fuel tank.

The fuel system components through which pressurized fuel is circulated comprise an engine 49. The liquid balancing conduit 47 comprises a liquid balancing valve 59. The vapor balancing conduit 91 comprises the vapor balancing valve 93. The method comprises closing the liquid balancing valve 59 when the engine 49 is off and opening the liquid balancing valve when the engine is on. Closing the liquid balancing valve 59 when the engine 49 is off can avoid a tendency of fluid in one tank flowing to another tank when, for example, the vehicle is parked with one tank in the sun and one tank in the shade for an extended period of time when increased pressure in the warmer tank might cause fluid flow to the cooler tank. When the engine 49 is turned back on, the liquid balancing valve 59 can reopen and pressure in the first and second tanks 29 and 39 can be gradually equalized by fuel flowing through the liquid balancing conduit 47 from the high pressure tank to the low pressure tank. If a vapor balancing conduit 91 is provided, it may be desirable to leave the vapor pressure balancing valve 93 open while the vehicle sits in the sun and the engine is turned off so that vapor pressure in the tanks 29 and 39 can be equalized through the vapor balancing conduit while the vehicle rests.

Unequal pressure in the first and second fuel tanks 29 and 39 can also be equalized by other means, including by adjusting the pressure drop across the first and second return lines 35 and 45 by adjusting the degree to which the first and second return valves 63 and 65 are open or closed. For example, if pressure in the first fuel tank 29 is higher than the pressure in the second filet tank 39 when the engine 49 is started, the liquid balancing valve 59 will open and fluid will flow from the first fuel tank to the second fuel tank to start equalizing the pressure. In addition, to reduce pressure in the first fuel tank 29 relative to the pressure in the second fuel tank more rapidly, the first return valve 63 may be partially or completely closed while the second return valve 65 is held fully open until pressure is equalized. When balancing pressure in the first and second fuel tanks 29 and 39 using only a liquid balancing conduit 47, liquid levels in the first and second tanks are ordinarily monitored to avoid overfilling the lower pressure tank or over-emptying the higher pressure tank. The use of a liquid balancing conduit 47 can be of particular benefit when, for some reason, liquid levels in the tanks are different. Use of a vapor balancing conduit 91 will prevent pressure in one tank from being greater than pressure in the other tank and can be useful in avoiding overfilling or over-emptying tanks. Providing both a liquid balancing conduit 47 and a vapor balancing conduit 91 may be useful to ensure that liquid levels can be quickly adjusted when necessary via the liquid balancing conduit (ordinarily closing the vapor balancing conduit) and, when liquid levels are equal, maintaining them that way by keeping vapor pressure in the tanks equal through the vapor balancing conduit.

Unequal pressure in the first and second fuel tanks 29 and 39 can also be equalized by still further means, including by adjusting the rate at which the first and second fuel pumps 31 and 41 pump fuel from the tanks. The rate at which the fuel pumps pump fuel can be adjusted by adjusting the operation of the pumps themselves, or by adjusting the degree to which the first and second feed valves 73 and 75 are open or closed, or both. The first and second fuel pumps 31 and 41 can also be controlled so that pressure in the first and second feed lines 33 and 43 is equal even though there may be unequal pressure in the first and second fuel tanks 29 and 39.

The various techniques for equalizing pressure in the first and second fuel tanks 29 and 39 can be used individually or in combination.

The vapor balancing conduit 91 is open to the first fuel tank 29 and to the second fuel tank 39 above a maximum liquid level MAXLL1 of the first fuel tank and a maximum liquid level MAXLL2 of the second fuel tank, and the vapor pressure balancing valve 93 is disposed in the vapor balancing conduit. The vapor pressure balancing valve 93 can be opened when liquid levels in the first fuel tank 29 and the second fuel tank 39 have been equalized and equal amounts of fuel are being drawn from and returned to each tank. If both a liquid balancing conduit 47 and a vapor pressure balancing valve 93 are provided, the vapor balancing conduit can be closed when liquid levels in the first fuel tank 29 and the second fuel tank 39 are not equal so that increased vapor pressure in the tank with more fuel will tend to force the fuel into the tank with less fuel through the liquid balancing conduit. The vapor pressure balancing valve 93 can be open during filling of the first and second fuel tanks 29 and 39 via the fill line 81 to facilitate a faster fueling operation. For example, having the vapor pressure balancing valve 93 open can facilitate filling of both tanks 29 and 39 at a substantially equal rate and in an equal amount without vapor pressure in one of the tanks interfering with fueling of that tank and possibly slowing the filling process.

The present invention thus proposes an array of solutions for equalizing pressure in multiple fuel tanks of a pressurized fuel system, most of which can be used independently but which can often more advantageously be used in combination. According to an aspect of the present invention, pressure is equalized b making pressure drops across return lines leading to each of the fuel tanks from a circulation system equal. According to another aspect of the invention, pressure is equalized by providing symmetrical arrangements for each fuel tank arrangement 27 and 37, or as close to symmetrical as possible. According to another aspect of the invention, pressure is equalized by having a liquid balancing conduit 47 run from the bottom of each fuel tank 29 and 39 to permit liquid flow between the tanks so that liquid fuel will flow from the higher pressure tank to the lower pressure tank and thereby tend to reduce pressure in the higher pressure tank. According to another aspect of the invention, the return line valves 63 and 65 in the return lines 35 and 45 leading to each of the fuel tanks 29 and 39 can be controlled to equalize pressure in the tanks, such as by closing a valve in a return line leading to a tank at higher pressure. According to still another aspect of the present invention, a vapor balancing conduit 91 run from the tops of each fuel tank 29 and 39 to permit vapor flow between the tanks can be used to equalize pressure in the tanks.

The minimum liquid levels MINLL1 and MINLL2 are typically chosen to be the levels at which there is still some volume of fuel remaining in the tanks, typically enough to permit operation of the engine for an additional period of time, such as a period of time sufficient to reach a next fueling section, but may vary extensively from system to system. Typically, MINLL1 and MINLL2 are chosen so that there is at least about 5% of the entire tank volume remaining. The maximum liquid levels MAXLL1 and MAXLL2 are typically chosen to be the levels at which there is a sufficient expansion volume remaining in the tanks after filling to those levels at approximately 20° C. and 5 bars so that there is volume remaining for the fuel to expand if higher temperatures are encountered, such as might occur if the tanks are left in the sun, which can cause expansion of the liquid DME and increased vapor pressure, and so that there is a substantial safety factor provided for avoiding bursting of the tanks due to increased pressure. Typically, the expansion volume is provided as about 5-20% of the tank volume above the MAXLL1 and MAXLL2 levels. For propane, current industry recommendations are that a 20% expansion volume be provided and, for DME, recommendations are that a 15% expansion volume be provided. In all events, MINLL1 and MINLL2 and MAXLL1 and MAXLL2 and expansion volumes are set to comply with any applicable regulations.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A vehicle comprising a pressurized liquid fuel system, comprising:
   fuel system components including a circulation system through which pressurized liquid fuel is circulated;
   a first pressurized liquid fuel tank arrangement including a first fuel tank, a first fuel pump, a first feed line connected to the circulation system, and a first return line connected to the circulation system;
   a second pressurized liquid fuel tank arrangement including a second fuel tank, a second fuel pump, a second feed line connected to the circulation system, and a second return line connected to the circulation system; and
   a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank,
   wherein the first return line and the second return line are configured such that a pressure drop across the first return line from the circulation system to the first fuel tank is the same as a pressure drop across the second return line from the circulation system to the second fuel tank.

2. The vehicle as set forth in claim 1, wherein the fuel system components comprise an engine, the circulation system comprises a feed portion upstream of the engine and a return portion downstream of the engine, and the fuel system components comprise one or more fuel injectors arranged to inject some pressurized liquid fuel in the feed portion into cylinders of the engine.

3. The vehicle as set forth in claim 1, wherein the first return line and the second return line are symmetrical relative to the circulation system.

4. The vehicle as set forth in claim 1, wherein the first return line and the second return line have a same length.

5. The vehicle as set forth in claim 1, wherein the first return line and the second return line have a same diameter.

6. The vehicle as set forth in claim 1, wherein the fuel system components comprise an engine, the balancing conduit comprises a balancing valve, and the vehicle comprises a controller arranged to close the balancing valve when the engine is off and to open the balancing valve when the engine is on.

7. The vehicle as set forth in claim 6, comprising a first return valve in the first return line and a second return valve in the second return line, the controller being arranged to control opening and closing of the first return valve and the second return valve upon start-up of the engine to alter the pressure drop across the first return line from the return portion of the circulation system to the first fuel tank and across the second return line from the return portion of the circulation system to the second fuel tank to equalize pressure in the first and second fuel tanks.

8. The vehicle as set forth in claim 7, wherein the balancing valve and the first and second return valves are electronically controlled valves.

9. The vehicle as set forth in claim 8, further comprising a balancing conduit manual valve in the balancing conduit, a first return line manual valve in the first return line, and a second return line manual valve in the second return valve.

10. The vehicle as set forth in claim 1, comprising a first return valve in the first return line and a second return valve in the second return line, a controller arranged to control opening and closing of the first return valve and the second return valve upon start-up of the engine to alter the pressure drop across the first return line from the circulation system to the first fuel tank and across the second return line from the circulation system to the second fuel tank to equalize pressure in the first and second fuel tanks.

11. The vehicle as set forth in claim 1, comprising a fill line for filling the first and second fuel tanks with pressurized liquid fuel.

12. The vehicle as set forth in claim 11, wherein a single balancing conduit is connected to the first fuel tank and to the second fuel tank, the single balancing conduit being open to the first fuel tank and the second fuel tank above the maximum liquid level of the first fuel tank and the maximum liquid level of the second fuel tank.

13. The vehicle as set forth in claim 1, wherein a single balancing conduit is connected to the first fuel tank and to the second fuel tank, the single balancing conduit being open to the first fuel tank and the second fuel tank above the maximum liquid level of the first fuel tank and the maximum liquid level of the second fuel tank.

14. A vehicle comprising a pressurized liquid fuel system, comprising:
fuel system components including a circulation system through which pressurized liquid fuel is adapted to be circulated;
a first pressurized liquid fuel tank arrangement including a first fuel tank, a first fuel pump, a first feed line connected to the circulation system, and a first return line connected to the circulation system;
a second pressurized liquid fuel tank arrangement including a second fuel tank, a second fuel pump, a second feed line connected to the circulation system, and a second return line connected to the circulation system; and
a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank,
wherein the first return line and the second return line are configured such that a pressure drop across the first return line from the circulation system to the first fuel tank is adapted to be the same as a pressure drop across the second return line from the circulation system to the second fuel tank, and wherein the first feed line and the second feed line are configured such that a pressure drop between the first fuel pump and the circulation system across the first feed line is adapted to be the same as a pressure drop between the second fuel pump and the circulation system across the second feed line.

15. The vehicle as set forth in claim 1, wherein the balancing conduit opens to the first fuel tank and to the second fuel tank below the minimum liquid level of the first fuel tank and the minimum liquid level of the second fuel tank and at least a portion of the balancing conduit is disposed above the minimum liquid level of the first fuel tank and the minimum liquid level of the second fuel tank.

16. A method for operating a pressurized liquid fuel system, comprising:
circulating pressurized liquid fuel through fuel system components including a circulation system;
pumping pressurized liquid fuel from a first pressurized liquid fuel tank via a first fuel pump to the circulation system through a first feed line connected to the circulation system while also pumping pressurized liquid fuel from a second pressurized liquid fuel tank to the circulation system via a second fuel pump through a second feed line connected to the circulation system;
returning pressurized liquid fuel to the first pressurized liquid fuel tank from the circulation system through a first return line connected to the circulation system while also returning pressurized liquid fuel to the second pressurized liquid fuel tank from the circulation system through a second return line connected to the circulation system so that a pressure drop across the first return line from the circulation system to the first fuel tank and across the second return line from the circulation system to the second fuel tank is the same, the first and the second return line having equal lengths and diameters so that a pressure drop due to line length and diameter across the first return line from the circulation system to the first fuel tank and across the second return line from the circulation system to the second fuel tank is the same; and
balancing pressure in the first fuel tank and the second fuel tank by permitting flow between the first fuel tank and the second fuel tank through a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank.

17. The method as set forth in claim 16, wherein the fuel system components comprise an engine, the balancing conduit comprises a balancing valve, and the method comprises closing the balancing valve when the engine is off and opening the balancing valve when the engine is on.

18. The method as set forth in claim 16, wherein a single balancing conduit is connected to the first fuel tank and to the second fuel tank, the single balancing conduit being open to the first fuel tank and the second fuel tank above the maximum liquid level of the first fuel tank and the maximum liquid level of the second fuel tank, a vapor pressure balancing valve being disposed in the single balancing conduit, the method comprising opening the vapor pressure balancing valve when liquid levels in the first fuel tank and the second fuel tank are equal.

19. A method for operating a pressurized liquid fuel system, comprising:
circulating pressurized liquid fuel through fuel system components including a circulation system;
pumping pressurized liquid fuel from a first pressurized liquid fuel tank via first fuel pump to the circulation system through a first feed line connected to the circulation system while also pumping pressurized liquid fuel from a second pressurized liquid fuel tank to the circulation system via a second fuel pump through a second feed line connected to the circulation system;
returning pressurized liquid fuel to the first pressurized liquid fuel tank from the circulation system through a first return line connected to the circulation system while also returning pressurized liquid fuel to the second pressurized liquid fuel tank from the circulation system through a second return line connected to the circulation system, the first and the second return line having equal lengths and diameters so that a pressure drop due to line length and diameter across the first return line from the circulation system to the first fuel tank and across the second return line from the circulation system to the second fuel tank is the same; and balancing pressure in the first fuel tank and the second fuel tank by
- permitting flow between the first fuel tank and the second fuel tank through a balancing conduit open to the first fuel tank and to the second fuel tank at least one of above a maximum liquid level of the first fuel tank and a maximum liquid level of the second fuel tank and below a minimum liquid level of the first fuel tank and a minimum liquid level of the second fuel tank, and
- adjusting pressure drop across at least one of the first return line from the circulation system to the first fuel tank and the second return line from the circulation system to the second fuel tank so that pressure drop across the first return line from the circulation system to the first fuel tank is different from pressure drop across the second return line from the circulation system to the second fuel tank such that pressure in the first fuel tank and the second fuel tank is balanced.

20. The method as set forth in claim 19, wherein the fuel system components comprise an engine, the balancing conduit comprises a balancing valve, and the method comprises closing the balancing valve when the engine is off and opening the balancing valve when the engine is on.

21. The method as set forth in claim 19, wherein the step of adjusting pressure drop across at least one of the first return line from the circulation system to the first fuel tank and the second return line from the circulation system to the second fuel tank comprises at least one of opening and closing at least one of a first return valve in the first return line and a second return valve in the second return line.

* * * * *